May 21, 1968
K. J. IFIELD ET AL
TORQUE CONTROL MEANS FOR VARIABLE
DISPLACEMENT HYDRAULIC PUMPS
Filed Nov. 12, 1965
3,384,019
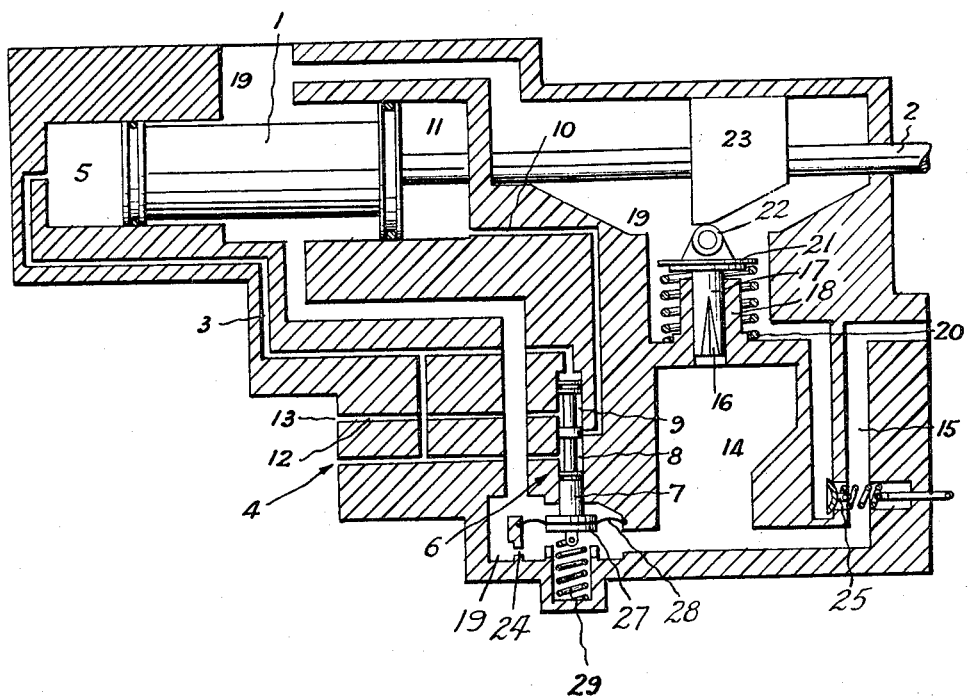
INVENTORS:
KENNETH J. IFIELD &
WILLIAM R. IFIELD
by: Stephen H. Frishauf
Atty

United States Patent Office 3,384,019
Patented May 21, 1968

3,384,019
TORQUE CONTROL MEANS FOR VARIABLE DISPLACEMENT HYDRAULIC PUMPS
Kenneth J. Ifield, Dural, New South Wales, and William R. Ifield, Beecroft, New South Wales, Australia, assignors, by mesne assignments, to Joseph Lucas (Industries) Limited, Birmingham, England, a corporation of England
Filed Nov. 12, 1965, Ser. No. 511,020
Claims priority, application Australia, Nov. 16, 1964, 51,732/64
15 Claims. (Cl. 103—38)

ABSTRACT OF THE DISCLOSURE

A fluid-operated servo-motor regulates the displacement of a variable displacement pump; fluid from the pump is supplied to a chamber, having a bleeder valve, the position of which and thus the extent of bleed being dependent of the position of a servo-motor and thus on pump displacement; and a comparator valve is provided responsive to pressure in the chamber and further inducting connection to the comparator valve to control the position of the servo-motor.

---

In many applications of variable displacement hydraulic pumps a high delivery pressure is required when the fluid flow is small but lower delivery pressures are required when the fluid flow is large. In view of the foregoing, and as it would be uneconomic to provide a driving motor of sufficient power to cater for the condition of a large flow at a high delivery pressure, control means are needed to ensure that the pump's displacement (and therefore the flow rate) decreases as the delivery pressure increases so that the driving power required never exceeds the available power. That is to say control means are required to limit the driving torque needed at any particular speed so that the driving power does not exceed the power available from the pump's driving motor at that speed.

One example of the use of a hydraulic pump where the delivery pressure and flow rate are related in the manner mentioned above is the use of a hydraulic pump and motor as the power transmission means for a vehicle. In that case high pressures are required at low flows for hill climbing and accelerating from rest, whereas larger flows at lower pressures are required when the vehicle is travelling on the level at a steady cruising speed. In such case it would be beyond the power of the engine to supply the larger flow at the higher pressure.

Another example is the use of an electric motor driven pump to transmit power to an injection moulding machine where high pressures at low flows are required to squeeze the die parts together, but large flows at low pressures are required for opening and closing the dies.

At any particular operating speed the torque needed to drive a positive displacement pump is proportional to the product of the displacement and the operating pressure, and the present invention makes use of that relationship to control the torque called for to drive the pump.

The invention consists in control means for controlling the displacement of a variable displacement hydraulic pump comprising a fluid-operated servo-motor adapted to regulate the pump's displacement, means to provide a first valve-operating fluid at a first pressure having a value which is a predetermined function of the pump's discharge pressure, means to provide a second valve-operating fluid at a second pressure having a value which is a predetermined function of the pump's displacement, and a fluid-operated comparator valve responsive to the relationship between said first and second pressures and controlling the supply of an operating fluid to said servo-motor in a manner which limits the driving torque to a predetermined value.

In preferred forms of control means according to the invention the said first pressure is equal to the pump delivery pressure or in fixed proportion thereof and is applied to the comparator valve in a manner tending to cause the valve to cause the servo-motor to reduce the pump's displacement while the said second pressure is inversely proportional to the pump's displacement and is applied to the comparator valve in opposition to the first pressure.

By way of example, an embodiment of the invention as applied to a uni-directional pump is described hereinafter with reference to the accompany drawing which is a diagrammatic cross-sectional view of said embodiment.

The control means illustrated by the drawing comprise a fluid operated servo-motor adapted to regulate the displacement of the pump being controlled. That servo-motor comprises a double ended piston 1 slideable in a dual bore cylinder and a control rod 2 extending from the piston 1 whereby movement of the piston 1 may be transmitted in a suitable manner to a pump for regulation of its displacement.

The connection between the control rod 2 and the pump is such that movement of the control rod outwardly of the control means, that is to say, to the right as seen in the drawing, causes the pump's displacement to decrease while movement of the control rod in the opposite direction effects an increase in the pump's displacement.

A high pressure duct system 3 is provided having an inlet port 4 whereby it may be connected to the high pressure or outlet port of the pump to be controlled. Thus, fluid at a pressure equal to the pump's delivery pressure is maintained within the servo-motor cylinder space 5 which continually tends to shift the piston 1 and control rod 2 outwardly.

A high pressure duct system 3 also communicates with a comparator valve 6 adapted to function as a control valve for the servo-motor. Thus the duct system 3 constitutes means to provide a first valve-operating fluid to the comparator valve 6 at a pressure equal to the pump's discharge pressure.

Comparator valve 6 is a spool type valve comprising an axially movable spool 7 slideable in a cylindrical bore and having piston portions thereon which define a high pressure gallery 8 and a low pressure gallery 9. It will be seen that the high pressure duct system 3 puts the high pressure gallery 8 into communication with the space 5 at one end of the servo-motor cylinder. A transfer duct 10 communicating with the servo-motor cylinder space 11 is closed at the comparator valve end or put into communication with one or other of the galleries 8 and 9 depending upon the position of the spool 7.

The low pressure gallery 9 may be connected to the pump's low pressure or inlet port by means of a low pressure duct 12 having an inlet 13.

If the spool 7 were to rise so as to put the transfer duct 10 into communication with the high pressure gallery 8, equal pressures will appear in the spaces 5 and 11 and, as the effective area of the piston 1 exposed to the space 11 is greater than that exposed to the space 5, the piston 1 would then move to draw the control rod 2 inwardly and so increase the pump's displacement. On the other hand if the spool 7 were to fall to put the intermediate duct 10 into communication with the low pressure gallery 9 the pressure in space 11 would drop to such an extent as to cause the piston 1 to move in the opposite direction. If the spool 7 adopts a central position (as shown in the drawing) the piston 1 necessarily remains stationary.

According to the example of the invention now being described, the said first pressure equals the pump's delivery pressure and is applied by means of duct system 3 to the upper end of the spool 7. That is to say, the first pressure is applied to the comparator valve in a manner tending to cause the valve to cause the servo-motor to reduce the pump's displacement. Therefore, in this instance, it is necessary for the second pressure (inversely proportional to the pump's displacement) to be applied to the bottom end of the spool 7. Thus, if the delivery pressure rises the spool 7 moves downwardly to allow fluid to flow from the space 11 so causing the piston 1 to move to the right to decrease the pump's displacement. Such a decrease in displacement is accompanied by a corresponding increase in the second pressure until the spool comes to rest once more when a new balance between the first and second pressures is effected. Exactly the opposite effect occurs if the delivery pressure falls, that is to say, the pump displacement is increased until the spool 7 once more reaches a stable position.

According to the illustrated embodiment of the invention the means to provide a second valve operating fluid (at said second pressure, inversely proportional to the pump displacement) comprise a control chamber 14, a chamber input duct 15 whereby fluid may be fed into the chamber 14 at a predetermined rate and means to bleed fluid from the control chamber 14 comprising a variable bleed orifice shown as a V-shaped slot 16 formed in the body of a cylindrical plug 17 adapted to slide longitudinally in a tubular spigot 18 extending from the control chamber 14. Thus, the effective area of the bleed orifice depends upon the extent to which the plug 17 is withdrawn from the spigot 18, that is to say it depends on the extent to which the outer end or tip of the V-shaped slot 16 is clear of the free end of the spigot 18.

It should be mentioned that the inter-connected spaces 19 are so called "spill" spaces from which spent or used fluid at low pressure may freely drain either to waste or into a suitable sump for re-use.

The plug 17 may be urged outwardly of the spigot 18 by a helical compression spring 20 sleeved over the spigot 18 and bearing against an outwardly directed peripheral flange 21 on the outer end of the plug 17. The spring 20 urges the plug 17, or preferably a roller follower 22 or the like on the plug 17, into contact with a cam element 23, which is shifted by the servo-motor as the servo-motor moves to alter the pump displacement, and which determines the extent to which the plug 17 protrudes.

It will be seen that the shape of the cam element 23 is such that inward or leftward movement of the control rod 2 (on which the cam element 23 is fixed) allows the plug 17 to move outwardly of the spigot 18. As movement of the control rod to the left causes an increase in the pump's displacement, it will be apparent that the pressure in chamber 14 will vary inversely with respect thereto if there is a constant flow of fluid into the chamber by way of duct 15.

Preferably, as the illustrated control means are for application to a positive displacement pump, a constant sized auxiliary orifice 24 is provided in parallel with the variable bleed orifice, so that the pump delivery pressure will not rise above a predetermined maximum value at very small displacements. Alternatively, the variable orifice (corresponding to orifice 16) may have a predetermined minimum area, or the maximum pump delivery pressure may be limited by a relief valve determining the maximum pressure of the second valve operating fluid.

Flow into the control chamber 14 may be provided from an external source through a flow control valve (not shown) which may be of a known type and may be manually operable or otherwise under an operator's control.

The absolute value of the pressure within the control chamber 14 will of course depend on the rate of inflow by way of duct 15, and the design or dimensions of the bleed orifice, and the effective area of the bottom of the spool 7 which is exposed to the said second pressure must be selected so as to produce a correct balance between the forces acting on the spool due to the first pressure and the second pressure respectively.

In the illustrated example of the invention, the lower end of the spool 7 is shown as enlarged, as called for when the second pressure is less than the first, by means of a head 27 and an annular flexible diaphragm 28.

If desired, a control spring 29 may be provided to assist in defining a normal rest position for the spool 7.

In those instances, in which the power or torque available from the driving engine for driving the pump varies with the speed of the driving engine, the feed-in rate of fluid to the control chamber 14 is preferably selected having a regard to the engine speed, or is automatically varied in response to changes in engine speed, in a way which ensures that the pump driving torques called for at various speeds are within the capacity of the engine at the speed in question. Furthermore, even for substantially constant speed internal combustion engines, speed response may be required as the nominal maximum torque setting may cause the engine to stall, if the engine is in poor condition or badly tuned or for any other reason the engine fails to achieve the torques for which it is designed.

One way of achieving a speed responsive flow into the control chamber 14 is to employ a positive displacement engine driven fluid supply pump for the supply of the fluid to the chamber input duct 15. The said fluid supply pump may have a manually controlled variable displacement for torque control. Alternatively, a flow proportioning valve may be employed with a fixed displacement fluid supply pump. The maximum delivery pressure of the hydraulic pump being controlled may then be determined by setting an upper limit to the fluid pressure in the control chamber by means, for example, of an adjustably spring loaded relief valve 25 which may discharge from the duct 15 into the spill space 19.

Alternatively, any speed responsive pressure such as the pressure generated by a centrifugal pump, may be used to regulate the pressure in the control chamber 14, and may be varied by employing a variable restricted input orifice, the variation in the flow area of the bleed orifice is then made such that the pressure between the two orifices is maintained at the desired function of displacement. Similar arrangements may also be used to provide a suitable fluid pressure in the control chamber from a constant pressure fluid source such that, the operator may vary the area of the input orifice or may control the supply pressure, to control the pump torque, and determine an upper limit to the supply pressure at small displacements.

In such embodiments of the invention regulation of the pressure in the control chamber by, for example, an operator, may be effected not only by directly modifying the flow into the chamber but also (or instead) by modifying the characteristics of the variable bleed orifice or the cam element. For example, there may be a number of orifices in parallel together with means enabling the operator to determine which of those orifices is to be in use at any one time.

In some instances the pump being controlled is controlled "overcentre" to provide forward and reverse flows. In such cases the size of the bleed orifice may be regulated by an overcentre or double faced cam element.

Alternatively two variable bleed orifices may be employed, one being operative in the forward direction of drive and the other being operative in the reverse direction of drive.

In such cases a changeover valve may be utilised to switch the high pressure and low pressure duct systems to the appropriate pump port (as the port pressures depend upon the direction of rotation of the pump).

According to other embodiments of the invention both the first and second pressures act on the comparator valve in the same direction. The combined forces may then be opposed by a spring, or by a control force, which for example may be a pressure under the operator's control acting on a sealed area. This system is particularly suitable for remote control by the regulation of the pressure of compressed air opposing the first and second pressures. The upper limit to the pump delivery pressure may be determined by the spring loading or by other control force.

In the embodiment of the invention now being described, the first pressure may again be equal to the pump delivery pressure but the second pressure is then directly proportional to the pump displacement (instead of inversely proportional as in the earlier described examples of the invention). The second pressure may be derived from means substantially the same as those previously described except for the reversal of the direction of the V-shaped slot shown in the drawing so that the pointed end of the slot is the innermost end instead of the outermost end, or reversal of the angle of the cam element face so as to reverse the bodily movement of the cam in relation to the component defining the V-shaped slot.

It will be appreciated that control means according to the invention may differ from the several embodiments described herein. In particular, any suitable comparator valve may be used (not necessarily a spool type valve) and said first and second fluids may be derived from any suitable sources and by any suitable means.

Also the means to bleed fluid from the control chamber (if present) may differ from the spigot and plug arrangements described above. For example a V-shaped or other relatively large port may be provided in the spigot which is progressively uncovered to a greater or lesser extent by the movement of a plain cylindrical plug slidable in the spigot. If desired, there may be a plurality of graded ports in the plug, or spigot or both which are uncovered sequentially as the plug moves. Then again instead of a plug sliding within a spigot a hollow cylindrical cover movable upon a ported projecting cylindrical plug or the like may be used. In short any suitable valve devices including a port or ports and a movable element may be employed which are openable or closeable to a variable extent by means of a suitable inter-connection of said movable element with the servo-motor or some other component of the system which moves in concert with that portion of the pump which moves to alter its displacement.

We claim:
1. Control means for controlling the displacement of a variable displacement hydraulic pump comprising
   a fluid operated servo-motor (1) arranged to regulate the displacement of the pump;
   a comparator valve (6) arranged in fluid communication to control the supply and escape of fluid to and from the servo-motor;
   first passage means (4) to supply fluid at the pressure of the pump outlet to said valve (6);
   means defining a chamber (14) to which fluid under pressure is supplied;
   valve means (16) responsive to the position of the servo-motor and controlling fluid flow from said chamber to control the pressure existing in the chamber to be dependent upon the position of the servo-motor and therefore of the pump displacement;
   pressure responsive means (28) arranged to transmit a control force resulting from the pressure in the chamber to the comparator valve (6);
   and further passage means interconnecting the comparator valve (6) and said servo-motor (1) so that said comparator valve controls the pressure existing in the servo-motor.
2. Control means according to claim 1 wherein said passage means supplying fluid at pump outlet pressure are connected to apply an operating force to said comparator valve in opposition to the control force applied to the comparator valve by said pressure responsive means.
3. Control means according to claim 2 wherein said control force is derived from a fluid pressure in said chamber and selectively determined by an operator of the pump.
4. Control means according to claim 1 wherein said comparator valve is a spool valve and wherein said pump outlet pressure is applied to one end of the spool and the pressure in said chamber is applied to the opposite end of the spool.
5. Control means according to claim 1 wherein said valve means (16) controlling fluid flow from said chamber comprises a bleed valve bleeding fluid from the control chamber and having at least one bleed orifice having an area which varies with pump displacement.
6. Control means according to claim 5 wherein said bleed valve to bleed fluid from the control chamber comprises a plurality of bleed orifices and a movable element adapted to cover or uncover said bleed orifices sequentially.
7. Control means according to claim 5 wherein said bleed valve to bleed fluid from the control chamber comprises a bleed orifice and a movable element adapted to cover or uncover said bleed orifice progressively.
8. Control means according to claim 5 wherein said pressure limiting means comprise a spring loaded relief valve.
9. Control means according to claim 1 wherein the feed in rate of fluid to the control chamber varies with pump speed.
10. Control means according to claim 5, wherein said valve comprises a tubular spigot extending from the control chamber and said bleed orifice is defined by a V-shaped slot formed in the body of a cylindrical plug which is able to slide longitudinally in said spigot, the effective area of the bleed orifice depending upon the extent to which the plug projects from the spigot.
11. Control means according to claim 10 including a cam element moved by said servo-motor, the extent to which said plug projects from the spigot being determined by said cam element as the servo-motor moves to modify the pump's displacement.
12. Control means according to claim 6 including a drive connection between said movable element and said servo-motor, the position of said movable element being determined by means of said drive connection.
13. Control means according to claim 7 including a drive connection between said movable element and said servo-motor, the position of said movable element being determined by means of said drive connection.
14. Control means according to claim 1 including pressure limiting means hydraulically connected to said chamber to ensure that the pressure in said chamber does not rise above a predetermined maximum.
15. Control means according to claim 5 including pressure limiting means comprising an auxiliary orifice of constant size located hydraulically in parallel with said variable bleed orifice.

References Cited

UNITED STATES PATENTS

| | | | |
|---|---|---|---|
| 2,238,061 | 4/1941 | Kendrick | 103—38 |
| 2,893,354 | 7/1959 | Austin et al. | 91—407 |
| 2,931,176 | 4/1960 | Bloch et al. | 103—38 |
| 3,015,212 | 1/1962 | Krafft et al. | 60—52 |
| 3,163,115 | 12/1964 | Neff et al. | 103—38 |
| 3,186,310 | 6/1965 | Neff et al. | 91—414 |
| 3,296,797 | 1/1967 | Tlusty | 60—52 |

FRED C. MATTERN, JR., *Primary Examiner.*

ROBERT A. O'LEARY, *Examiner.*

W. J. KRAUSS, *Assistant Examiner.*